US010025116B1

(12) United States Patent
Barrows

(10) Patent No.: US 10,025,116 B1
(45) Date of Patent: Jul. 17, 2018

(54) COMPOSITE OPTICAL LENS

(71) Applicant: Andrew Barrows, Maple Grove, MN (US)

(72) Inventor: Andrew Barrows, Maple Grove, MN (US)

(*) Notice: Subject to any disclaimer, the term of this patent is extended or adjusted under 35 U.S.C. 154(b) by 0 days.

(21) Appl. No.: 15/152,225

(22) Filed: May 11, 2016

Related U.S. Application Data

(60) Provisional application No. 62/159,581, filed on May 11, 2015.

(51) Int. Cl.
*G02C 7/16* (2006.01)
*G02C 7/10* (2006.01)

(52) U.S. Cl.
CPC .......... *G02C 7/104* (2013.01); *G02C 7/105* (2013.01); *G02C 7/108* (2013.01); *G02C 2202/16* (2013.01)

(58) Field of Classification Search
CPC ........ G02C 7/104; G02C 7/108; G02C 7/105; G02C 2202/16

USPC .............................................. 351/41, 44, 46
See application file for complete search history.

(56) References Cited

U.S. PATENT DOCUMENTS

| | | | | |
|---|---|---|---|---|
| 4,834,525 A | * | 5/1989 | Vansaghi | G02B 7/002 351/158 |
| 6,518,353 B2 | * | 2/2003 | Border | B82Y 30/00 524/413 |
| 8,096,652 B1 | * | 1/2012 | Carbone | G02C 3/003 351/124 |
| 9,581,829 B1 | * | 2/2017 | Li | G02C 1/10 |

* cited by examiner

*Primary Examiner* — Tuyen Tra
(74) *Attorney, Agent, or Firm* — Eggink & Eggink; Anthony G. Eggink; Katrina M. Eggink

(57) ABSTRACT

A composite optical lens structure for use in protective eyewear. The optical lens structure comprises a polymeric lens structure having an aperture therethrough. Inside and outside lens structures formed of glass are mounted to and within the aperture of the polymeric lens structure to provide a lightweight and economical composite optical lens.

5 Claims, 4 Drawing Sheets

COMPOSITE OPTICAL LENS

This application claims the benefit of U.S. Provisional Application Ser. No. 62/159,581, filed May 11, 2015, and which is fully incorporated by reference herein.

BACKGROUND OF THE INVENTION

The present invention relates generally to protective eyewear used by medical personnel and particularly to composite optical lenses for use in protective laser eyewear. More particularly, the invention relates to composite optical lenses which provide an economical and versatile means to construct and provide laser eyewear.

Various protective eye glasses and eyewear structures have been utilized in the past and also proposed for use in specific environments. For example, protective eye glasses are commonly utilized by medical personnel when laser devices are used in various medical procedures. Prior art protective eye glasses typically utilize laser absorbing lenses constructed of glass which are heavy and costly or polymeric in structure providing limited protection. Further, prior art protective eye wear typically protect against a specified laser wavelength or wavelength range thereby requiring the user to ensure that the proper protective wear is being utilized during specific procedures.

The composite optical lens structure of the present invention overcome the shortcomings of the prior art by providing lightweight and less expensive protective eyewear structures which are versatile in design and which protect a user in a wide range of the laser wavelength spectrum.

SUMMARY OF THE INVENTION

A composite lens structure for use in protective eye wear. The composite lens structure comprises the use of a light weight polycarbonate lens structure having an aperture therethrough. The polycarbonate lens structure represents the first lens structure or holding lens structure of the composite lens structure of the invention. A second lens structure formed of glass is positioned in the aperture of the first lens structure. The second lens structure may be unitary or bifurcated to provide a pair of second glass lens structures that are mounted on the inside and outside of the aperture of the first or holding lens structure by means of a peripheral ridge and an optically clear adhesive or a lens holding structure. The polycarbonate lens and the glass lens structures mounted within the polycarbonate lens provide the laser absorbing protective function for the user.

For example, the composite optical lenses may be utilized in protective laser eyewear to absorb wavelengths of 532 nm, 755-815 nm, 900-10,600 nm with an OD 5+, and other wavelength ranges of protection. The latter being provided by the outside and inside glass lens structure compositions, a single lens structure and/or by coatings thereon. The polycarbonate holding lens is preferably opaque, i.e., black, so as to absorb in the entire laser wavelength spectrum.

An advantage of the invention is to provide a composite optical lens structure for mounting in protective eyewear to provide a lightweight and economical structure which is versatile in design. Another advantage is to provide a composite optical lens structure to provide for a wide range of laser wavelength protection thereby permitting medical personnel to utilize a single protective laser eyewear frame for multiple procedures.

These and other advantages of this invention will become clear from the following description by reference to the drawings.

DESCRIPTION OF THE PREFERRED EMBODIMENTS

Figure 1:
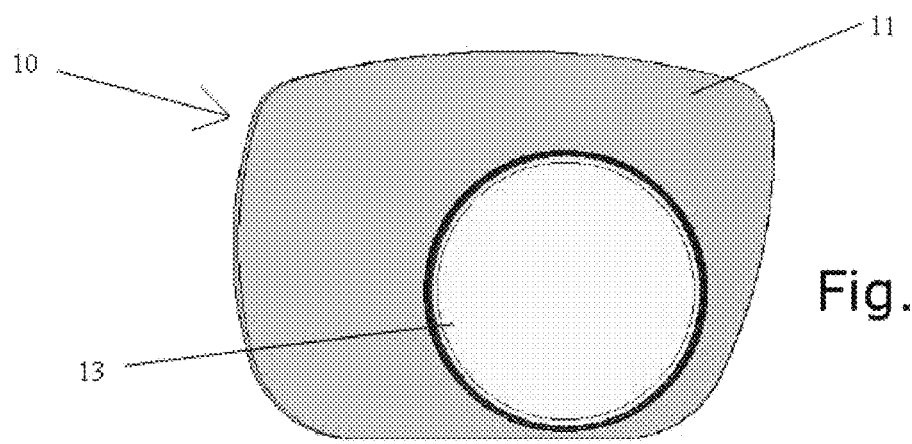
FIG. 1 is a frontal plan view of the composite optical lens of the present invention.
Figure 2:
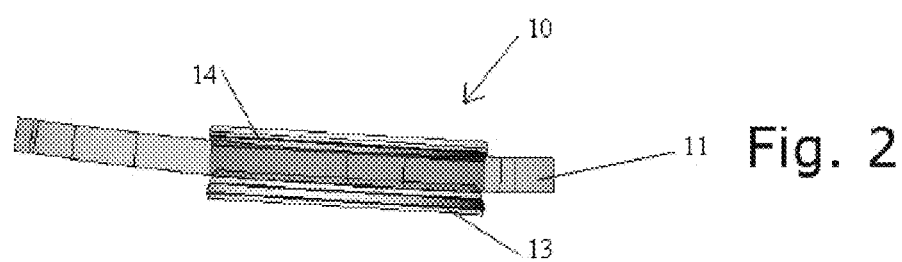
FIG. 2 is a top plan view thereof.

Referring to FIGS. 1 and 2, the composite lens structure 10 of the present invention is shown comprising a first lens structure 11 having an inside second lens structure 14 and an outside second lens structure 13 mounted therein. The first or holding lens structure 11 is preferably formed of a lightweight polymeric material such as a polycarbonate material which is commonly used in eye glasses, for example. The second outside and inside lens structures 13 and 14 are formed of glass, which may have lightwave absorption qualities, i.e., the absorption in the laser lightwave spectrum. For example, the composite optical lenses may be utilized in protective laser eyewear to absorb wavelengths of 532 nm, 755-815 nm, 900-10,600 nm with an OD 5+.

The present invention allows the combination of multiple glass and polycarbonate materials together within one laser eyewear frame structure. The laser filters may be lightly tinted offering excellent visibility and to provide laser protection for any wavelength combination needed. The laser glasses of the present invention eliminate the need to rotate between multiple pairs of laser glasses throughout the day, thereby reducing the risk of under-protection and the high costs associated with purchasing multiple different laser glasses.

Figure 3:
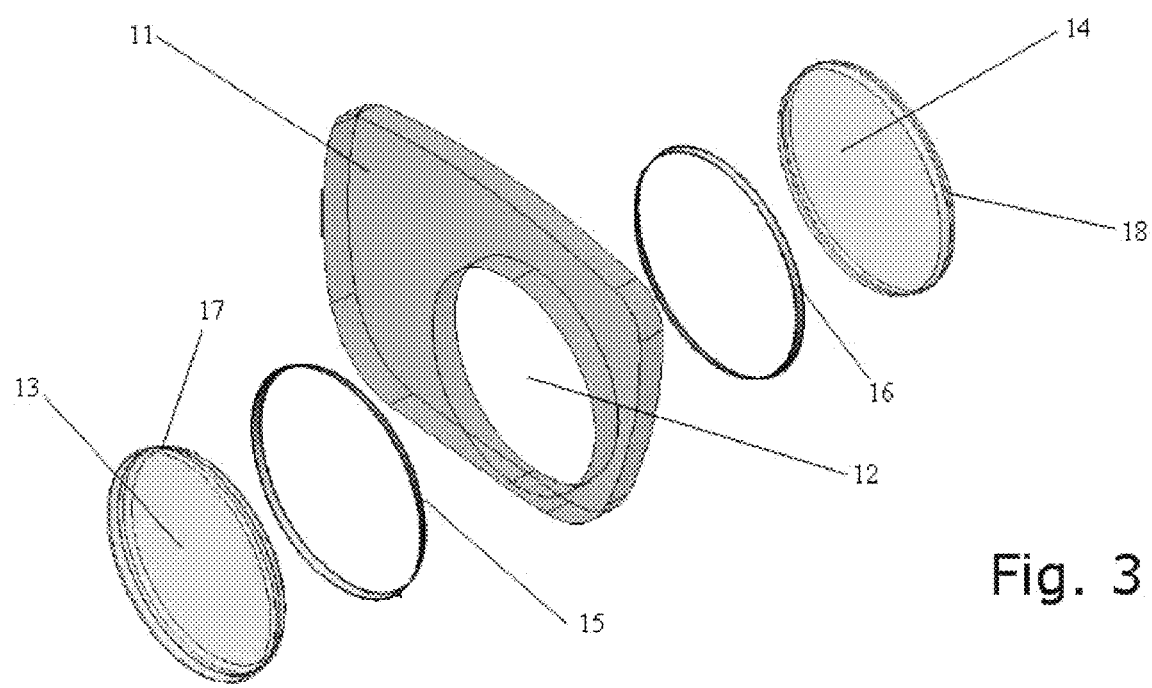
FIG. 3 is an exploded view showing the various components forming the composite optical lens of the invention.
Figure 7:
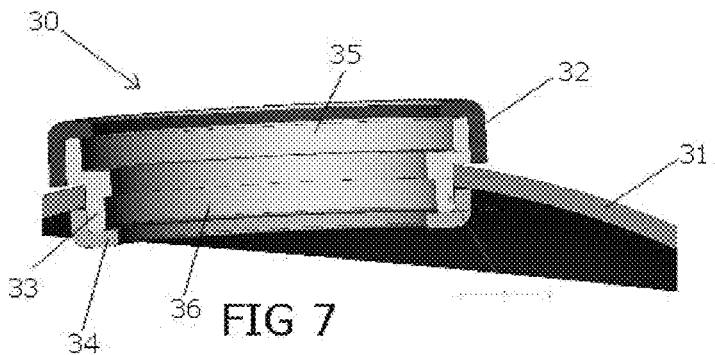
FIG. 7 is a sectional view showing a glass lens holding structure.
Figure 9:
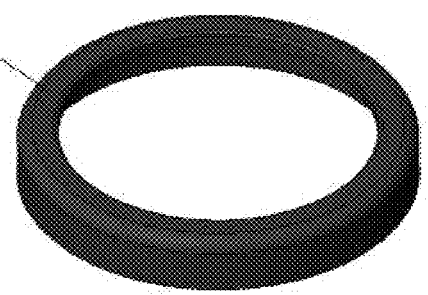
FIGS. 9-11 show the holding ring and inner and outer caps which form the lens holding structure of FIG. 7.
Figure 8:
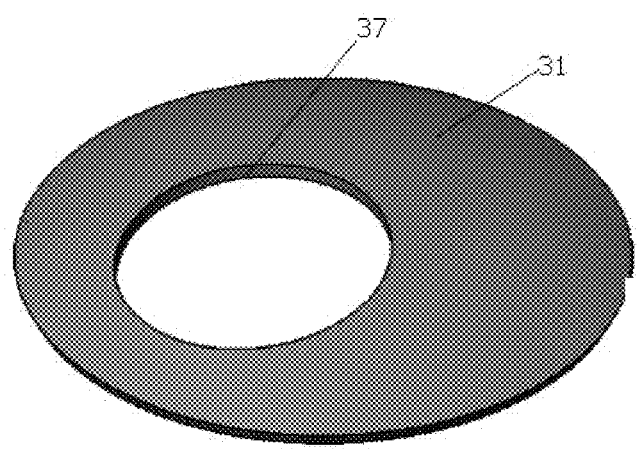
FIG. 8 is a perspective view showing a polycarbonate holding lens with an aperture.
Figure 10:
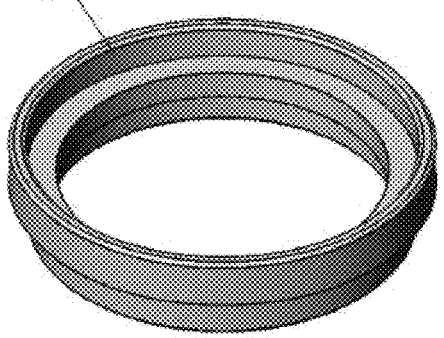
Figure 11:
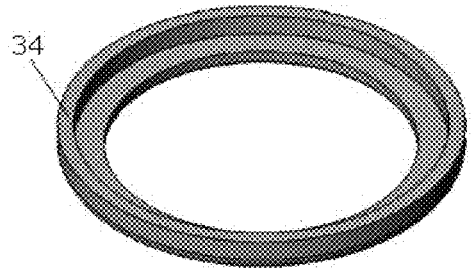

Exemplary lens filter combinations (FIG. 3 glass lenses 13,14; FIG. 7 glass lenses 35,36) may be as follows:

GT1 Filter

Wavelength protection offered: 532 nm (OD 7), 755-815 nm (OD 7), 900-10,600 nm (OD 5+), 1064 nm (OD 7)

Lasers protected against: KTP/YAG, Alexandrite, Diode, Nd:YAG, Fractional, Holmium, Erbium, and CO2 Lasers.

GS1.GP2 Filter

Wavelength protection offered: 570-595 nm (OD 6), 571-594 nm (OD 7), 735-755 nm (OD 7), 795-810 nm (OD 7), 925-1000 nm (OD 5), 1000-1025 nm (OD 6), 1025-1400 nm (OD 7), 1400-2400 nm (OD 4), 2770-10,600 nm (OD 4)

Lasers protected against: Pulsed Dye, Alexandrite, Diode, Nd:YAG, Fractional, Holmium, Erbium, and CO2 Lasers.

GT1.GP5 Filter
Wavelength protection offered: 532 nm (OD 7), 632 nm (OD 2+), 650-690 nm (OD 3+), 690-1000 nm (OD 6+), 755-815 nm (OD 7), 900-10,600 nm (OD 5+), 1,064 nm (OD 7)
Lasers protected against: KTP, Ruby, Alexandrite, Diode, Nd:YAG, KTP/YAG, Fractionals, Holmium, Erbium, and CO2 Lasers
BG3.GL2 Filter
Wavelength protection offered: 512-680 nm (OD 6+), 518-677 nm (OD 7+), 755-815 nm (OD 5+), 900-10,600 nm (OD 5+)
Lasers protected against: Argon. KTP, Dye, HeNe, Alexandrite, Diode, Nd:YAG, KTP/YAG, Fractionals, Holmium, Er:YAG and CO2 lasers.
BG3.OG57 Filter
Wavelength protection offered: 190-540 nm (OD 5), 512-680 nm (OD 6+), 518-677 nm (OD 7+)
Lasers protected against: Excimer, Argon, KTP, Dye, and HeNe lasers.

These are exemplary ranges of laser protection glass lenses that may be utilized in the polycarbonate holding lenses to form laser protection eyewear.

FIG. 3 is an exploded view of the composite lens structure shown in FIGS. 1 and 2. Lens structure 11 is shown having an aperture 13 therethrough and which may be in the form of a circle as shown. Outside lens 13 and inside lens 14, preferably formed of glass, are also shown having a circular configuration and having a peripheral circumferential lip 17 and 18, respectively, for positioning lenses 13 and 14 within aperture 12 of lens structure 11. The glass lenses 13 and 14 may have a thickness of approximately 3.3 mm, for example. An optically clear adhesive 15, 16, i.e., Loctite 3494 Adhesive, is shown used on the circumferential lips 17, 18 to mount the outside and inside lenses 13 and 14, respectively, to lens structure 11 in a sandwich like configuration.

Figure 4:
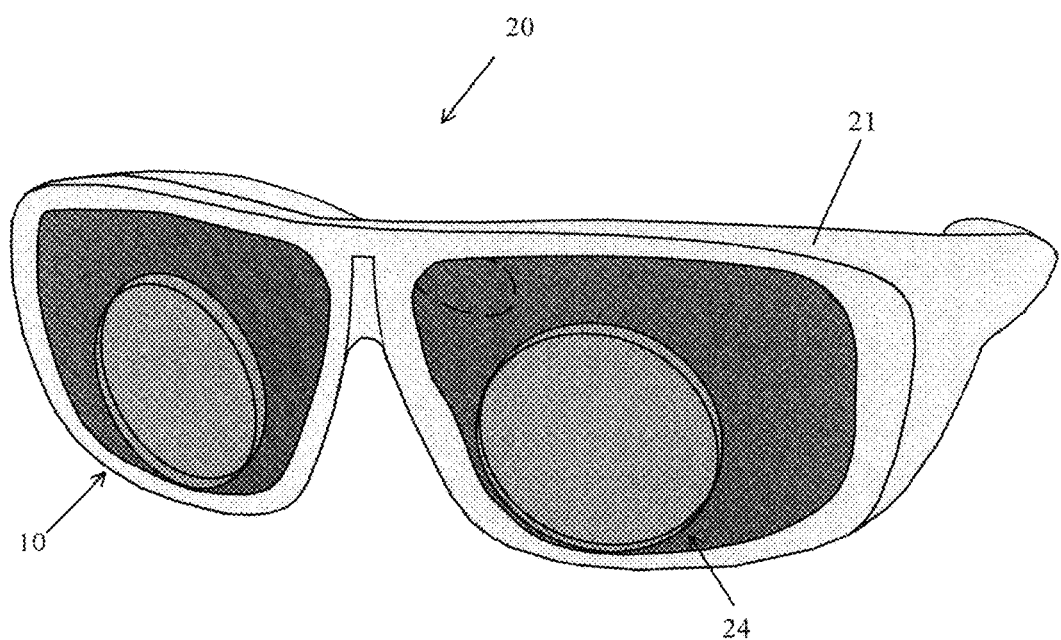
FIG. 4 is a perspective view showing the composite optical lenses of the invention mounted in a frame forming protective eyewear.

FIG. 4 is a perspective view of a pair of eye glasses 20 having composite lenses 10 and 24 mounted within the frames 21. Composite lens structure 24 is constructed in the same arrangement as composite lens structure 10 except for its shape or configuration. The inside and outside glass lens structures 14 and 13 are positioned in the polycarbonate lens structure 11 so as to be aligned with the field of vision of the user. The polycarbonate lens structure 11 is easily adaptable to be peripherally formed for mounting within any desired protective frame design.

The composite optical lenses may be utilized in protective laser eyewear to absorb wavelengths of 532 nm, 755-815 nm, 900-10,600 nm with an OD 5+, for example, as well as providing protection as set forth above. The latter being provided by the outside and inside glass lens structure compositions and/or by coatings provided on the glass lens structures. The polycarbonate holding lens is preferably opaque, i.e., black, so as to absorb in the entire laser wavelength spectrum.

Figure 5:
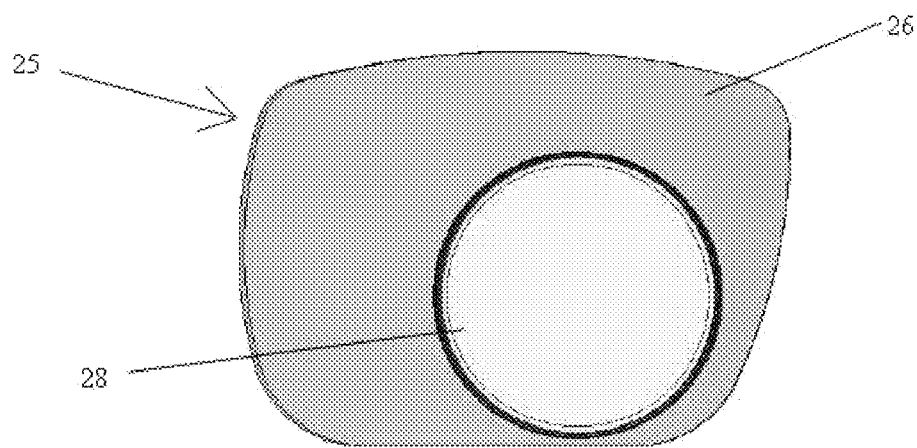
FIG. 5 is a frontal plan view of another embodiment of the composite lens of the invention.
Figure 6:
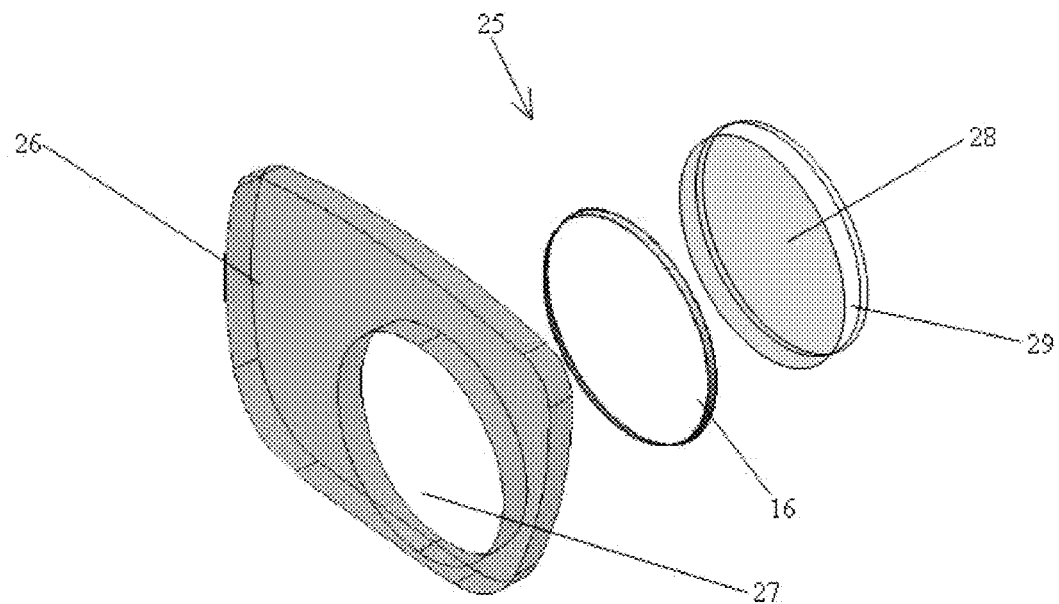
FIG. 6 is an exploded view showing the components forming the composite lens of FIG. 5.

Referring to FIGS. 5 and 6, another embodiment of the composite lens structure of the invention is shown. Composite lens structure 25 is shown having a first or holding polycarbonate lens structure 25 with a circular aperture 27 for receiving a single glass lens structure 28. The glass lens structure 28 is shown having a peripheral circumferential ridge 28 which allows the lens structure 28 to be mounted within aperture 27 of the holding lens structure 26 by means of adhesive 16. Alternatively, the lens structure 28 may be held via other means within lens structure 25.

The glass lens structures 13, 14 and 28 are provided to absorb light in the laser wavelength range, as discussed above. The glass lens structures may also be provided with coatings for light absorbing properties as well as scratch resistance, antireflective properties, antifog properties and may be formed to provide corrective lenses or prescription eyeglasses to the user of the protective eyewear utilizing the composite lenses.

Referring to FIGS. 7-11, the inner and outer lens structures 35, 36 may be held to and with respect to the polycarbonate lens structure 31 utilizing a lens holder assembly 30. The lens holder assembly 30 is shown constructed of a lens holding ring 33 and two opposing (inner 34 and outer 32) lens cap structures 32, 34 which may be joined together via an adhesive or other means. For example, two glass lenses 35,36 having differing wavelength protection may be placed in the lens holding ring 33 which is then placed in the opening 37 of the polycarbonate lens 31 and secured using the lens cap structures 32,34. The lens cap structures may be secured to the lens holding ring using an adhesive, a frictional snap fit or utilizing a threaded structure, although an adhesive may be preferred.

The utilization of the composite optical lens of the present invention in protective eyewear allows for the customization of protection in a wide range of laser use environments. The polymeric holding lenses permit the use of commonly provided frames whereas the utilization of the glass lens inserts provide for the versatility of protection in specified laser environments. The use of the composite optical lenses allow for the versatile customization of protective eyewear.

As many changes are possible to the composite optical lens embodiments of this invention utilizing the teachings thereof, the descriptions above, and the accompanying drawing should be interpreted in the illustrative and not in the limited sense.

That which is claimed is:

1. A composite optical lens comprising:
   a) a first lens structure having a predetermined configuration and a composition to filter laser light, said first lens structure having an inside surface, an outside surface and further having an aperture therethrough;
   b) a second and third lens structure each having a predetermined configuration and composition different from said first lens structure, said second and third lens structures being constructed and arranged to cover said aperture of said first lens structure, wherein a lens holder assembly is provided to hold said second and third lens structures within said aperture of said first lens structure, said lens holder assembly having a lens holding ring constructed and arranged to extend through said aperture in said first lens structure and for supporting said second and third lens structures spacially adjacent said inside and outside surfaces of said first lens structure, said lens holder assembly further having inner and outer opposing annular lens cap structures for peripherally securing said lens holding ring in said aperture of said first lens structure and to secure said second and third lens structures within said lens holder assembly to cover said aperture of said first lens structure; and
   c) wherein said second and third lens structures are formed of a composition to filter a predetermined wavelength range of laser light and having a predetermined optical density.

2. The composite optical lens of claim 1, wherein a glasses frame and a pair of said composite optical lenses are provided in said glasses frame.

3. The composite optical lens of claim 1, wherein said second and third lens structures are formed to filter different laser light wavelengths.

4. The composite optical lens of claim 1, wherein said aperture in said first lens structure is circular and wherein said second and third lens structures are circular.

5. The composite optical lens of claim 1, wherein said first lens structure is of an opaque polycarbonate composition.

\* \* \* \* \*